United States Patent
Westphal

(10) Patent No.: US 6,171,012 B1
(45) Date of Patent: Jan. 9, 2001

(54) RADIAL BALL-AND-SOCKET JOINT FOR A MOTOR VEHICLE

(75) Inventor: Paul Westphal, Stemwede (DE)

(73) Assignee: Lemförder Metallwaren AG (DE) (DE)

( * ) Notice: Under 35 U.S.C. 154(b), the term of this patent shall be extended for 0 days.

(21) Appl. No.: 09/214,794
(22) PCT Filed: May 7, 1998
(86) PCT No.: PCT/DE98/01268
  § 371 Date: Jun. 2, 1999
  § 102(e) Date: Jan. 7, 1999
(87) PCT Pub. No.: WO98/51935
  PCT Pub. Date: Nov. 19, 1998

(30) Foreign Application Priority Data

May 9, 1997 (DE) ............................................ 297 08 162 U

(51) Int. Cl.⁷ .................................................. F61C 11/06
(52) U.S. Cl. ............................ 403/137; 403/132; 403/135
(58) Field of Search .................................. 403/135, 132, 403/133, 140, 122, 137, 138, 136

(56) References Cited

U.S. PATENT DOCUMENTS

| 2,553,743 | * | 5/1951 | Booth | 403/132 X |
| 4,102,585 | * | 7/1978 | Herbenar | 403/138 |
| 4,430,016 | * | 2/1984 | Matsuoka et al. | 403/135 X |
| 4,564,307 | * | 1/1986 | Ito | 403/140 |
| 4,995,754 | * | 2/1991 | Ishii | 403/132 |
| 5,188,477 | * | 2/1993 | Idosako et al. | 403/133 |
| 5,655,848 | * | 8/1997 | Catron | 403/137 |
| 5,697,723 | * | 12/1997 | Wood | 403/132 X |
| 5,851,082 | * | 12/1998 | Schmudde et al. | 403/132 X |

FOREIGN PATENT DOCUMENTS 44 01 639 A1   8/1995  (DE) .
295 09 566   10/1995  (DE) .

* cited by examiner

Primary Examiner—Harry C. Kim
(74) Attorney, Agent, or Firm—McGlew and Tuttle, PC.

(57) ABSTRACT

A radial ball-and-socket joint for a motor vehicle with a housing and a ball pivot, whose joint ball is mounted movably in all directions in a bearing shell, is presented, in which the bearing shell (1) has a two-part design and the joint ball (3.1) of the ball pivot (3) is radially progressively pretensioned by at least one damping element (2) between the upper shell (1.1) and the lower shell (1.2). The damping element is inserted into the housing (4) and has a lower Shore hardness than the bearing shell (1), wherein the bearing shell is only in punctiform or linear contact with the joint ball (3.1) of the ball pivot (3) in the unloaded state of the joint.

14 Claims, 3 Drawing Sheets

RADIAL BALL-AND-SOCKET JOINT FOR A MOTOR VEHICLE

FIELD OF THE INVENTION

The present invention pertains to a radial ball-and-socket joint for a motor vehicle.

BACKGROUND OF THE INVENTION

Ball-and-socket joints for various applications have been known. While the principal load is directed in the case of axial ball-and-socket joints mainly in the axial direction relative to the nondeflected ball pivot, a radial ball-and-socket joint is designed for a predominantly radial load. Thus, such joints differ in terms of their function and partly also in terms of their design.

For example, an axial ball-and-socket joint, which comprises a metallic housing that is open on one side, in which a ball pivot is mounted in a bearing shell, which is held in the housing by material deformation of the open housing edge, has been known from DE 295 09 566. The bearing shell consists of plastic and is supported on the side of the housing, with which a fastening pin is made in one piece on the outside, with an oblique surface against a complementary oblique surface on the housing, and against a buffer inserted between the bearing shell and a radial support surface formed on the housing. This buffer may consist of a rubber ring possessing a selected elastic material stiffness. As a result, the compensation of the clearance between the bearing shell and the joint housing is said to be achieved. In addition, a support joint, in which the joint ball of the ball pivot is mounted in a bearing shell, has been known from DE 44 01 639 A1. To make it possible to apply a progressive pretension to the joint ball, a pressure shell is inserted between the joint ball and the cover closing the joint, and both the cover and the pressure shell have, on at least one side, partially the surface shape of a ball each with different radii.

SUMMARY AND OBJECTS OF THE INVENTION

The basic technical object of the present invention is to develop a radial ball-and-socket joint that has low friction and a damping action and compensates tolerances, in addition to having a simple design.

According to the invention, a radial ball-and-socket joint for a motor vehicle is provided. The joint includes a housing with a bearing shell disposed in the housing. A ball pivot is provided with a joint ball mounted movably in all directions in the bearing shell. A damping element is provided. The damping element has a lower Shore hardness than the bearing shell. The bearing shell contacts the joint ball in one of punctiform or linear manner. In an unloaded state of the joint, the joint ball of the ball pivot is radially progressively pretensioned by the damping element.

The radial ball-and-socket joint according to the present invention for motor vehicles has a housing and a ball pivot, whose joint ball is mounted movably in all directions in a bearing shell. The bearing shell may have a one-part or multipart design. In the case of a two-part design of the bearing shell, at least one damping element, which radially progressively pretensions the joint ball of the ball pivot, is inserted into the housing between the upper shell and the lower shell. Progressive pretensioning is defined here as a pretension increasing with increasing radial load.

The damping element has a lower Shore hardness than the bearing shell, and the bearing shell is only in punctiform or linear contact with the joint ball of the ball pivot in the unloaded state of the joint.

In the case of a one-part bearing shell, it is advantageous to insert the damping element directly into the bearing shell.

Depending on the corresponding damping means selected, radial pretension and elasticity of the mount can be achieved corresponding to the needs. A modular system was thus created, which makes it possible to select the characteristics of a ball-and-socket joint mount as desired. Consequently, to reach other characteristics in one type of joint, only a damping means having a higher or lower Shore hardness must be used. Such a radial ball-and-socket joint is characterized by good damping characteristics. The driving behavior of a motor vehicle can thus be decisively influenced by the use of the radial ball-and-socket joints according to the present invention.

It is also achieved due to the punctiform or linear contact of the bearing shell that a low break-away torque of a radial ball-and-socket joint according to the present invention and thus, on the whole, very low coefficients of friction can be guaranteed under normal load.

The bearing shell may be provided with ribs on its outer contact surface contacting the housing. Lubricant recesses may additionally also be provided on the inner and/or outer surface of the bearing shell in the known manner.

Other embodiments of the present invention are the subject of the subclaims. Thus, a punctiform or linear contact of the bearing shell with the joint ball of the ball-and-socket joint can be achieved by the radius of the joint ball being selected to be smaller than the radius of the spherical inner jacket surface of the bearing shell. The bearing shell should have at least one bead-like area, which is a limited area when viewed in the circumferential direction, which is directly in contact with the joint ball.

However, the gap may also be brought about either by the ball or the inner geometry of the bearing shell deviating from the geometry of a ball at least in some areas. For example, an oval shape is considered according to the present invention.

In another embodiment of the idea of the present invention, the damping element may be a rubber ring with a defined elastic characteristic. This damping element may advantageously have a spherical contour. Other cross-sectional shapes, e.g., an annular cross section, an approximately triangular cross section, or a square cross section are, of course, also within the scope of the idea of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
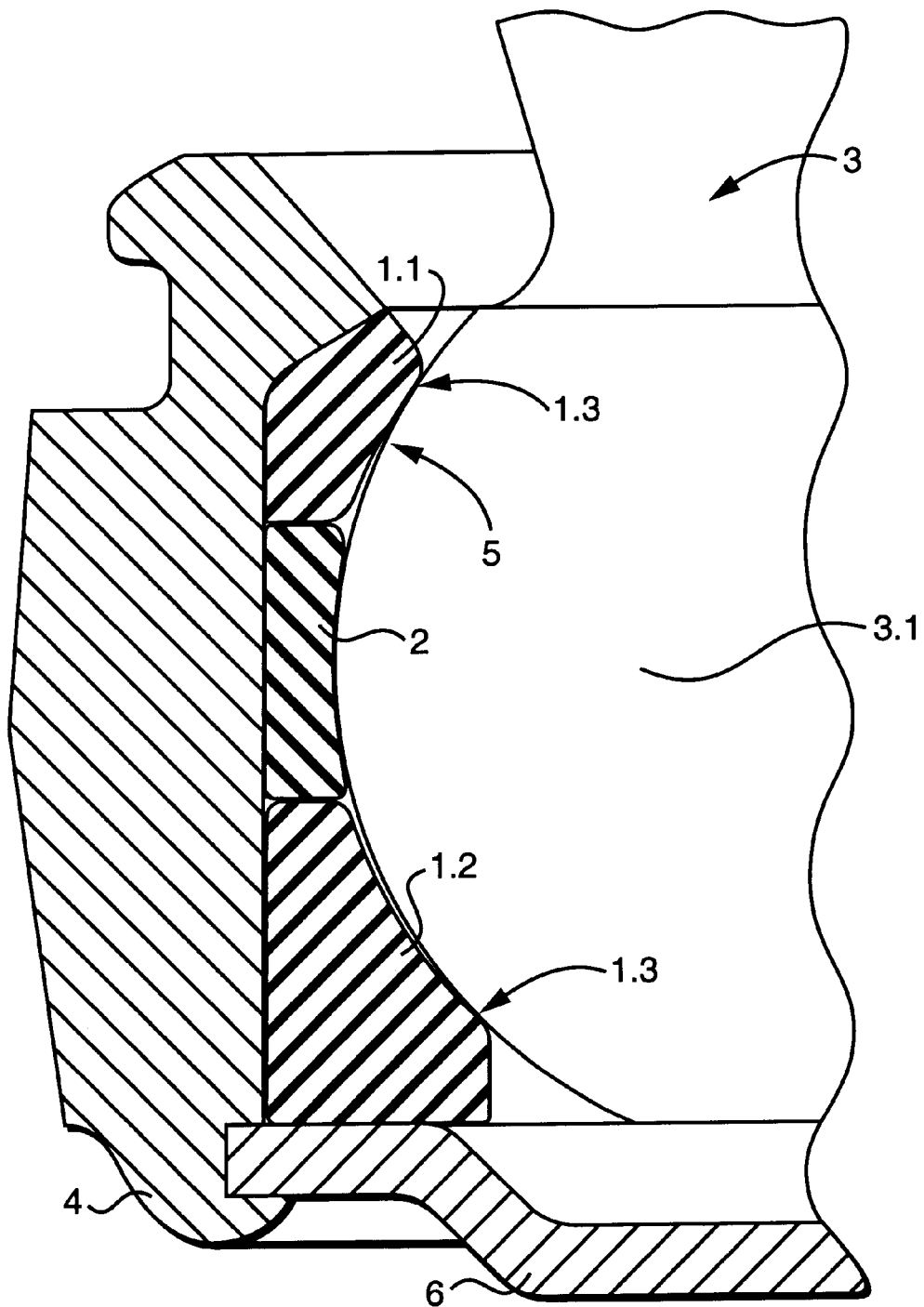
FIG. 1 is a sectional view of a radial ball-and-socket joint according to the present invention in the unloaded state.
Figure 3:
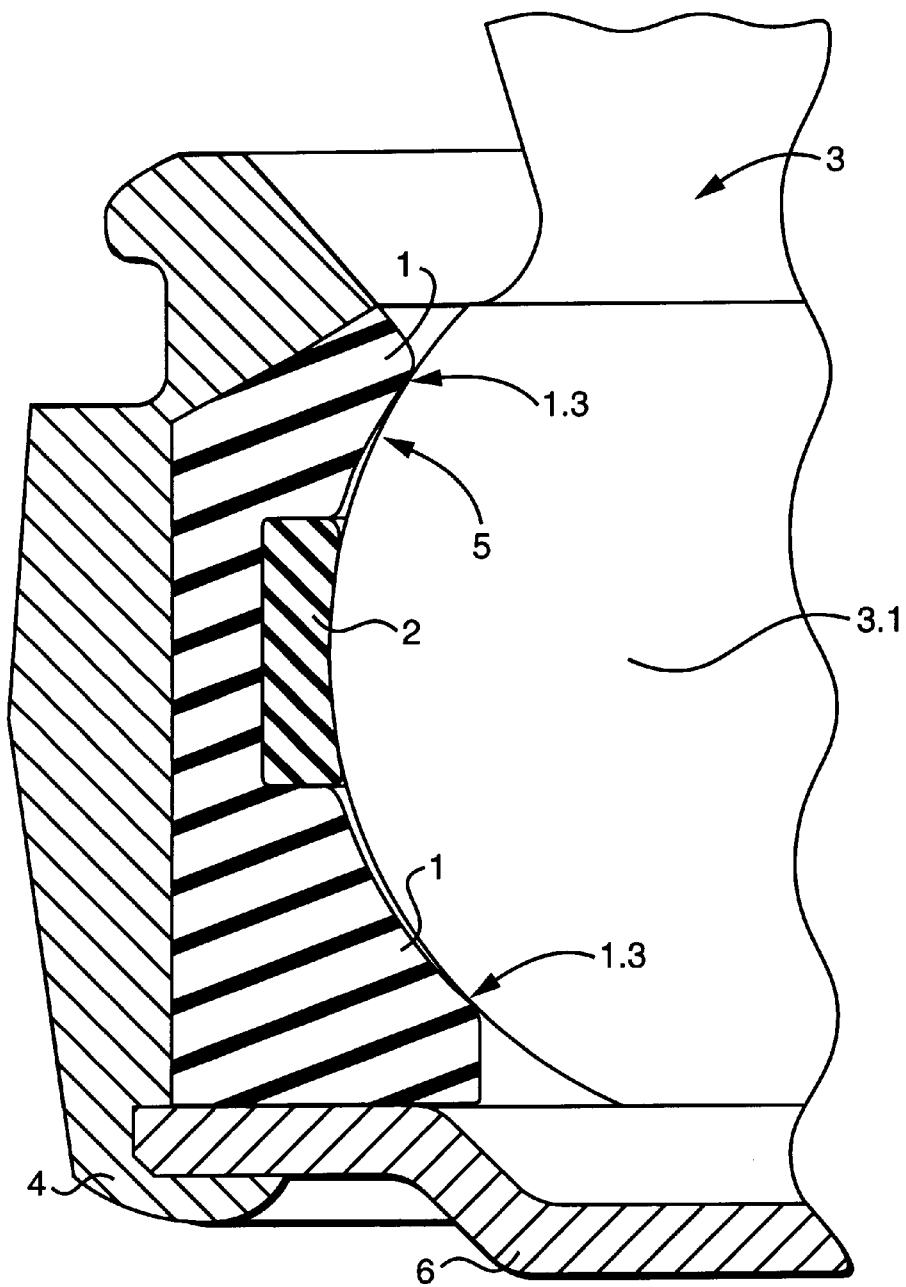
FIG. 3 is a sectional view of a radial ball-and-socket joint with a one piece bearing shell.

Referring to the drawings in particular, a preferred radial ball-and-socket joint according to the present invention for a motor vehicle, as is shown as an example in FIG. 1, has a housing 4 and a ball pivot 3, whose joint ball 3.1 is mounted movably in all directions in a bearing shell 1. The bearing shell has a two-part design in the exemplary embodiment of FIG. 1, and a one part design in FIG. 3. It comprises an upper shell 1.1 and a lower shell 1.2. A damping element 2, which radially progressively pretensions the joint ball 3.1 of the ball pivot 3, is inserted into the housing 4 between the upper shell and the lower shell. As shown in FIGS. 1 and 3, the damping element 2 is arranged radially around a maximum diameter of the joint ball 3.1 for the radial pretensioning or loading. This damping element has a lower Shore hardness than the bearing shell, and the bearing shell is in only punctiform or linear contact with the joint ball of the ball pivot.

It is achieved due to the punctiform or linear contact of the bearing shell that a low moment of friction and low break-away torque can be guaranteed within a radial ball-and-socket joint according to the present invention, and very low coefficients of friction can thus be guaranteed, on the whole, under normal load.

The punctiform or linear contact of the bearing shell with the joint ball of the ball pivot is achieved here due to the fact that the radius of the joint ball 3.1 is selected to be smaller than the radius of the spherical inner jacket surface of the bearing shell. However, the upper and lower shells have a bead-like area 1.3 each, which is in direct contact with the joint ball. As a result, a hollow space 5 is left between the joint ball and the bearing shell in the unloaded joint. This hollow space has a gap width between 0.001 mm and 1 mm, but preferably up to 0.5 mm according to the present invention. This range of gap widths has proved to be particularly advantageous. The gap increases in the direction of the equator beginning from the bead-like area 1.3.

However, the gap may also be brought about by either the ball 3.1 or the inner geometry of the bearing shell 1 deviating from the geometry of a ball at least in some areas.

The contact surface, whose dimensions are small and which is brought about by the bead-like area, leads to very low coefficients of friction in a radial ball-and-socket joint according to the present invention in the unloaded state, i.e., such a joint has an extremely low moment of friction or break-away torque. In the embodiment shown, the damping element is a simple rubber ring having a defined elastic characteristic, whose outer circumference inserted into the housing is cylindrical and whose contact surface contacting the joint ball has an arch opposite that of the joint ball radius, so that a pretensioning is applied to the joint ball as a result. The arch opposite the joint ball cannot be recognized in the representation because the joint ball 3.1 is inserted into the bearing shell and the rubber ring is therefore already exerting its pretensioning function on the joint ball. The joint is closed with a cover 6 on one side. A sealing bellows, not shown in FIG. 1, is mounted on the side located opposite the cover.

Figure 2:
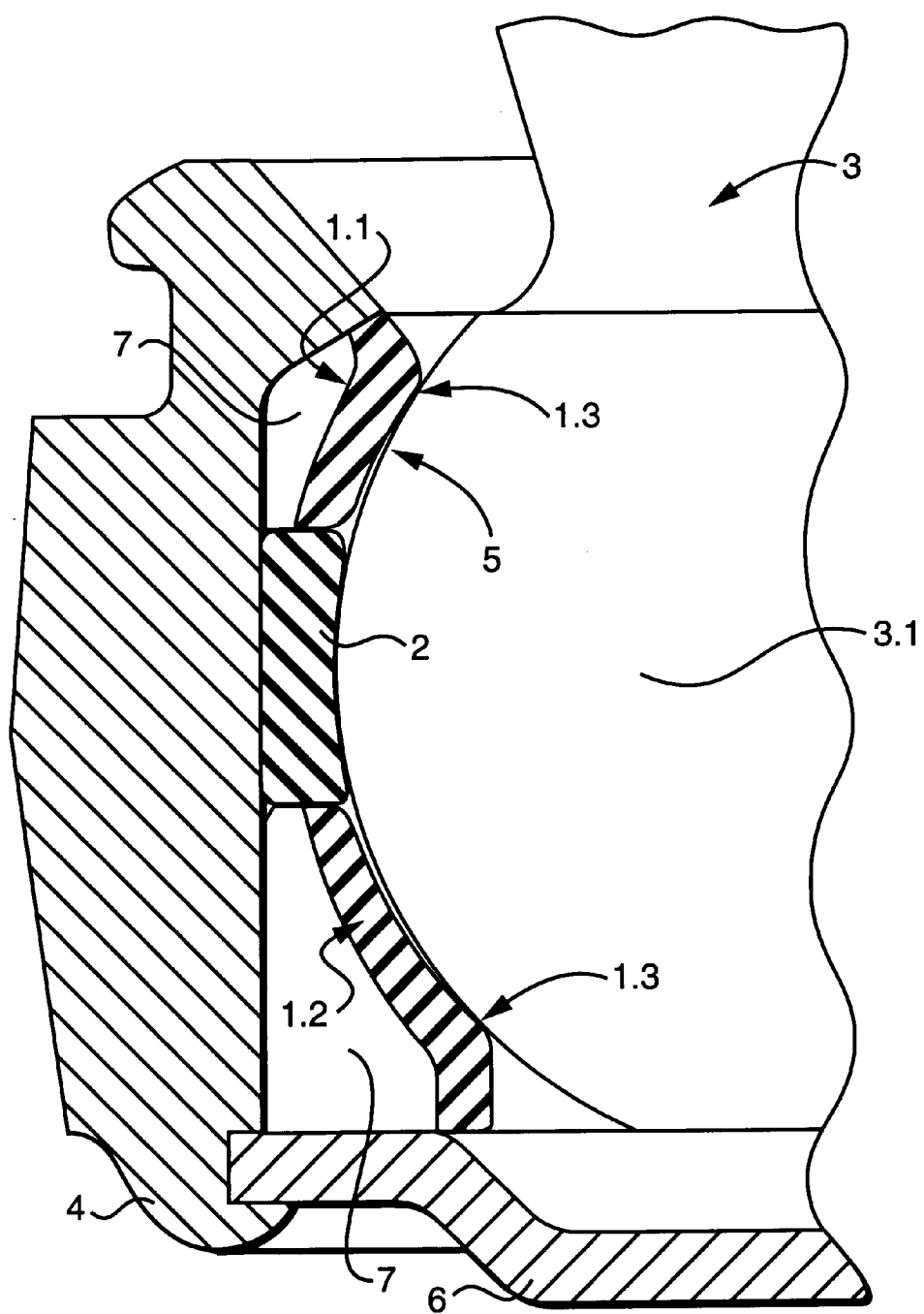
FIG. 2 is a sectional view of another radial ball-and-socket joint according to the present invention in the unloaded state.

FIG. 2 shows an embodiment of a ball-and-socket joint according to the present invention that has basically the same design as that in FIG. 1. The only difference here is that the two-part bearing shell 1.1, 1.2 is provided with ribs 7 in some areas on its outer contact surface with which it is in contact with the housing 4.

While specific embodiments of the invention have been shown and described in detail to illustrate the application of the principles of the invention, it will be understood that the invention may be embodied otherwise without departing from such principles.

What is claimed is:

1. A radial ball-and-socket joint for a motor vehicle, the joint comprising:
   a housing;
   a bearing shell disposed in said housing, said bearing shell having a two-part design with an upper shell and a lower shell;
   a ball pivot with a joint ball mounted movably in all directions in said bearing shell;
   a damping element inserted into said housing and between said upper shell and said lower shell, said damping element having a lower Shore hardness than said bearing shell, said bearing shell being only in one of punctiform or linear contact with said joint ball of said ball pivot in an unloaded state of the joint, said joint ball of said ball pivot being radially progressively pretensioned by said damping element.

2. The radial ball-and-socket joint for a motor vehicle in accordance with claim 1, wherein said joint ball has a radius which is smaller than a radius of a spherical inner jacket surface of said bearing shell, said bearing shell having at least one limited bead-like area having a radius approximately equal to said radius of said joint ball.

3. The radial ball-and-socket joint for a motor vehicle in accordance with claim 1, wherein said damping element is a rubber ring having a defined elastic characteristic.

4. A radial ball-and-socket joint for a motor vehicle, the joint comprising:
   a housing;
   a bearing shell disposed in said housing, said bearing shell having a one-part design;
   a ball pivot with a joint ball mounted movably in all directions in said bearing shell;
   a damping element inserted directly into the bearing shell, said damping element having a lower Shore hardness than said bearing shell, said bearing shell being only in one of punctiform or linear contact with said joint ball of said ball pivot in an unloaded state of the joint, said joint ball of said ball pivot being radially progressively pretensioned by said damping element.

5. The radial ball-and-socket joint for a motor vehicle in accordance with claim 4, wherein said joint ball has a radius which is smaller than a radius of a spherical inner jacket surface of said bearing shell, said bearing shell having at least one limited bead-like area having a radius approximately equal to said radius of said joint ball.

6. The radial ball-and-socket joint for a motor vehicle in accordance with claim 4, wherein said damping element is a rubber ring having a defined elastic characteristic.

7. A radial ball-and-socket joint for a motor vehicle, the joint comprising:
   a housing;
   a bearing shell disposed in said housing, said bearing shell having either a one-part design or a two-part design;
   a ball pivot with a joint ball mounted movably in a plurality of directions in said bearing shell;
   a damping element disposed in said housing, said damping element being inserted into said housing and having a lower Shore hardness than said bearing shell, said bearing shell being only in one of punctiform or linear contact with said joint ball of said ball pivot in an unloaded state of the joint, said joint ball of said ball pivot being radially progressively pretensioned by said damping element.

8. The radial ball-and-socket joint for a motor vehicle in accordance with claim 7, wherein said joint ball has a radius which is smaller than a radius of a spherical inner jacket surface of said bearing shell, said bearing shell having at least one limited bead-like area having a radius approximately equal to said radius of said joint ball.

9. The radial ball-and-socket joint for a motor vehicle in accordance with claim 7, wherein said damping element is a rubber ring having a defined elastic characteristic.

10. The radial ball-and-socket joint in accordance with claim 7, wherein:
   said damping element is arranged in contact with said joint ball.

11. The radial ball-and-socket joint in accordance with claim 10, wherein:
   said damping element has an arch shape for radial pre-tensioning of said joint ball.

12. The radial ball-and-socket joint in accordance with claim 7, wherein:
   said damping element has an arch shape for radial pre-tensioning of said joint ball.

13. The radial ball-and-socket joint in accordance with claim 7, wherein:
   said damping element is arranged radially around a maximum diameter of said joint ball for radial pre-tensioning of said joint ball.

14. The radial ball-and-socket joint in accordance with claim 7, wherein:
   said joint ball contacts said bearing shell at only two bead-like areas in said unloaded state of the ball-and-socket joint.

* * * * *